United States Patent [19]

Sprouse

[11] Patent Number: 5,506,066
[45] Date of Patent: Apr. 9, 1996

[54] ULTRA-PASSIVE VARIABLE PRESSURE REGENERATIVE FUEL CELL SYSTEM

[75] Inventor: Kenneth M. Sprouse, Northridge, Calif.

[73] Assignee: Rockwell International Corporation, Seal Beach, Calif.

[21] Appl. No.: 209,897

[22] Filed: Mar. 14, 1994

[51] Int. Cl.⁶ .................................................. H01M 8/04
[52] U.S. Cl. ........................................... 429/21; 429/26
[58] Field of Search .................... 429/21, 26; 220/581, 220/592

[56] References Cited

U.S. PATENT DOCUMENTS

| | | | |
|---|---|---|---|
| 795,870 | 8/1905 | Voelke | 220/592 |
| 4,657,829 | 4/1987 | McElroy et al. | 429/19 |
| 4,677,040 | 6/1987 | Specht | 429/17 |
| 4,839,247 | 6/1989 | Levy et al. | 429/21 |
| 4,988,580 | 1/1991 | Ohsaki et al. | 429/21 X |
| 5,064,732 | 11/1991 | Meyer | 429/13 |
| 5,190,184 | 3/1993 | Lechner | 220/581 |
| 5,250,368 | 10/1993 | Golben et al. | 429/17 |
| 5,277,994 | 1/1994 | Sprouse | 429/17 |

*Primary Examiner*—Stephen Kalafut
*Attorney, Agent, or Firm*—George A. Montanye; Harry B. Field; Steven E. Kahm

[57] ABSTRACT

An ultra-passive, variable pressure, regenerative fuel cell system in accordance with the invention utilizes a single gaseous hydrogen storage tank that encloses a plurality of smaller gaseous oxygen storage tubes. This design effectively eliminates the need for active pumping elements to protect the fuel cell's anode surface. A single heating/cooling coil, inside the gaseous hydrogen storage tank, is used to prevent: (a) icing inside the storage tanks due to isentropic expansion during electrical power generation, or (b) overheating of gases due to isentropic compression during electrical recharging operations. Advantageously, the invention also reduces the overall weight and mechanical complexity of the fuel cell system, thereby improving system reliability.

15 Claims, 3 Drawing Sheets

ULTRA-PASSIVE VARIABLE PRESSURE REGENERATIVE FUEL CELL SYSTEM

TABLE OF CONTENTS
BACKGROUND OF THE INVENTION
1.1 Configuration of a Typical Fuel Cell
1.2 Basic Operational Components of a Fuel Cell System
1.3 Problem of Fuel Cell PEM Membrane Drying
1.4 Some Prior Approaches to the PEM Dryout Problem
2. SUMMARY OF THE INVENTION
3. BRIEF DESCRIPTION OF THE DRAWINGS
4. DETAILED DESCRIPTION OF SPECIFIC EMBODIMENTS
4.1 Hollow Artery Anode Wick Designs
4.1(a) Wagon-Wheel Wick Design
4.1(b) Woven-Cloth Wick Design
4.2 Single Gaseous Storage Tank Design
4.3 Advantages of Invention
5. CLAIMS
ABSTRACT

1. BACKGROUND OF THE INVENTION

This application claims priority on allowed and commonly owned U.S. patent application 08/201,508, filed on 24 Feb. 1994, entitled "A Quasi-Passive Variable Pressure Regenerative Fuel Cell System."

The invention relates, in general, to an apparatus for converting chemical energy into electrical energy through the process of electrolysis of water. Specifically, the invention describes an apparatus for the implementation of a passive, variable pressure regenerative, fuel cell system. During power drawing operations, a fuel cell generates energy by combining hydrogen and oxygen gas to form water. During charging operations, an electrolyzer is used to convert water back into its constituent parts; hydrogen and oxygen.

1.1 Configuration of a Typical Fuel Cell

A typical electricity - generating fuel cell is shown schematically in FIG. 1. Each cell is comprised of an anode chamber 100 having a porous anode 105 and a cathode chamber 110 having a hydrophobic porous cathode 115 separated by an electrolytic membrane 120, known as a proton exchange membrane (PEM). As is well-known to those of ordinary skill, this membrane may be an acid or a solid polymer such as Nafion™ (a trademarked product of E. I. DuPont de Nemours of Wilmington, Del., which is a polymer of polytetrafluoroethylene with fluorinated ether side chains terminated with sulfonic acid groups). The PEM material is designed to readily permit the transport of ions and solvent between the anode and cathode chambers, but to be relatively impermeable to gas.

During power generation at terminals 135, hydrogen is typically applied to a fuel cell's anode 105 via an opening 125 and oxygen 140 to the cell's cathode 115, with water 130 forming in the cell's cathode chamber 110 from oxidation of the hydrogen. On the other hand, during charging operations, water is typically applied to the cell's anode 105, with oxygen being extracted from the cell's anode chamber 100 via an opening 125, and hydrogen 130 being extracted from its cathode chamber 110.

1.2 Basic Operational Components of a Fuel Cell System

Referring to FIG. 2, it is well-known to those of ordinary skill that fuel cell systems have long been used in specialized electrical power generation applications such as spacecraft. In such systems, a plurality of fuel cells (e.g., a fuel cell system) can behave as a monolithic battery. A battery 200 includes a fuel cell 205 and additional supporting equipment (not shown). The battery 200 delivers electrical power over a power line 210 to electrical loads such as lights 215, radios 220, and so forth.

As shown in FIG. 3, a basic passive, variable pressure, regenerative fuel cell system 200 from the prior art comprises a regenerative fuel cell component 205 which sits above a main water tank 300, an electrolyzer 305 which sits below the main water tank 300, a small secondary water tank 3 10, a water flow restriction orifice or fluid flow valve 315 communicating with the main water storage tank 300 and the secondary water storage tank 310, a liquid gas separator 320, a gaseous hydrogen storage tank 325, and a gaseous oxygen storage tank 330. Such fuel cell systems commonly use a multiplicity of fuel cells which are designed, for example, to deliver 30 kilowatt-hours of electrical energy at a nominal power level of 2.5 kilowatts at 120 volts. (For convenience, the expression "fuel cell" is used to represent an element comprised of one, or more, individual fuel cells unless otherwise noted.)

Typically, a hydrogen line 335 from the hydrogen supply tank 325 is connected to both the fuel cell 205 and electrolyzer 305. In this configuration, hydrogen is supplied to the anode side of the fuel cell 205 (during power generation operations) and is extracted from the cathode side of the electrolyzer 305 (during recharge operations). An oxygen line 340 is attached to the water tank 300 which, via line 345, directs oxygen to the fuel cell's 205 cathode.

The fuel cell, water tank, and electrolyzer are stacked vertically as shown so that liquid water produced at the fuel cell's cathode (where electrons are consumed) is concurrently drained directly into the main water tank 300 through line or conduit 345 via gravitational forces, while water stored in the main water tank can be, in turn, gravitationally fed to the anode side of the electrolyzer (where electrons are produced) through line or conduit 350.

During recharge operations, oxygen produced at the electrolyzer's 305 anode passes through line 350 and into water tank 300 where it bubbles up, through line 340, to the oxygen storage tank 330. Concurrently, hydrogen produced at the electrolyzer's cathode is returned to the hydrogen storage tank 325 through a liquid-gas separator 320.

Individual cells of both the fuel cell and electrolyzer are sometimes interconnected in a series arrangement, often called a "stack." The number of cells in this series is determined by the desired DC voltage. Under fully charged conditions (approximately 21 Mpa or 3,000 psi) the open circuit DC voltage of each individual fuel cell is approximately 1.3 volts while under fully discharged conditions (approximately 0.7 Mpa or 100 psia) the open circuit DC voltage of each cell is approximately 1.2 volts.

1.3 Problem of Fuel Cell PEM Membrane Drying

A major concern in a fuel cell system such as that shown in FIG. 3 is to prevent dryout, and the devolatilization and cracking of the fuel cell's 205 PEM anode surface that may result, during brief periods of water feed interruption to the anode chamber 100 which are made possible by the passive operating nature of this electrochemical device. Dryout can occur because aqueous protons migrating across the PEM 120 during normal fuel cell operation (from anode side to cathode side) carry liquid water molecules along with them which, if not replenished, will lower the water concentration on the PEM's anode surface. Dryout prevention is often accomplished by holding a reservoir of excess water in close contact with the fuel cell's PEM anode surface. Any PEM dryout at high cell pressures will quickly lead to electrolyte oxidation and subsequent fuel cell failure.

1.4 Some Prior Approaches to the PEM Dryout Problem

One prior approach to solving the problem of proton exchange membrane dryout in regenerative fuel cells is proposed in U.S. Pat. No. 4,657,829 to McElroy et al. McElroy et al. propose a hydrogen/air fuel cell having a water electrolysis subsystem and gas storage system. The electrolysis subsystem comprises a plurality of bipolar cells. Water is introduced into the anode chambers of the electrolysis cells from liquid/vapor separators. Hydrogen and oxygen produced by the cells are fed to these liquid/vapor separators. Excess water from the anode chamber, and water pumped via electroosmosis across the membrane with the hydrogen ions, is separated from the gases and introduced into respective pressurized storage vessels. Each storage vessel contains a float switch which actuates pumps and drain valves to feed water to the electrolyzer. As the oxygen and hydrogen in the pressure vessels are consumed, their pressure drops and a signal from a pressure transducer causes additional water to be electrolyzed to replenish depleted oxygen and hydrogen levels. The electrolyzer system associated with a fuel cell stack described above is potentially limited, however, by a multiplicity of possible switching and fluid flow control functions.

Another proposed solution is set out in U.S. Pat. No. 5,064,732, to Meyer. The Meyer '732 patent proposes disposing a porous element between two adjacent cells of a fuel cell stack, namely the cathode chamber of a first cell and the anode chamber of a second cell. A pressure differential is maintained across the porous element to cause water to pass through the porous element from the cathode chamber to the anode chamber. A potential detriment with the Meyer '732 patent is that the cathode chamber must always be held at a higher pressure than the anode chamber. This can prevent the operation of the electrolyzer during power generation operations.

The prior approaches discussed above share some common general problems. Most notably, a variety of additional equipment is needed to address the problem of PEM dryout. Additional pumps, valves, compressors, and so forth add to the cost of systems, increase their weight, and contribute to whatever unreliability problems may already exist. (It is a well-known fact of engineering that the greater the number of components involved in a system, in general the shorter the mean time to failure of the system.)

FIG. 4 shows another prior art approach that makes use of pressure differentials between the hydrogen storage tank 325 and the oxygen storage tank 330. During fuel cell operation, the temperatures in the tanks are controlled via temperature control elements 400 so that the hydrogen storage tank is at a lower pressure than the oxygen storage tank so that water will flow from the water tank into the anode side of the fuel cell. During electrolyzer operation on the other hand, the pressures in the tanks are reversed by the temperature control elements 400 so that water, produced at the cathode side of the electrolyzer, is allowed to flow back into the water tank, facilitated by having the hydrogen storage tank 325 pressure higher than the oxygen storage tank 330 pressure. As with the other prior approach techniques discussed, this solution requires extra equipment to implement and, therefore, suffers from the same cost and reliability drawbacks as the previously cited prior art designs.

2. SUMMARY OF THE INVENTION

Conventional passive, variable pressure, regenerative fuel cell systems utilize mechanical valves, pressure regulators, feed pumps, and recirculation pumps. Many systems also include active heating and cooling control loops in both the gaseous hydrogen and oxygen storage tanks to feed water to the anode side of the fuel cell during electrical power production (to prevent fuel cell anode drying), and for draining water from the cathode side of the electrolyzer during electrical recharging operations.

A passive regenerative fuel cell system in accordance with the invention utilizes a single gaseous hydrogen storage tank that encloses a plurality of smaller gaseous oxygen storage tubes. This design effectively eliminates the need for active pumping elements to protect the fuel cell's anode surface. A single heating/cooling coil, inside the gaseous hydrogen storage tank, is used to prevent: (a) icing inside the storage tanks due to isentropic expansion during electrical power generation, or (b) overheating of gases due to isentropic compression during electrical recharging operations. Advantageously, the invention also reduces the overall weight and mechanical complexity of the fuel cell system, thereby improving system reliability.

Another distinctive aspect of the invention is its use of an anode wick to substantially reduce the probability of drying a fuel cell's anode membrane surface. An anode wick, in accordance with the invention, establishes a physical connection between a fuel cell's anode membrane surface and a liquid water reservoir. Wicking action substantially ensures the cell's anode surface is continually bathed in water. Two mechanical check valves are incorporated to effectively prevent mixing of gaseous hydrogen and oxygen gases in the event the fuel cell system's water tanks become over pressurized.

3. BRIEF DESCRIPTION OF THE DRAWINGS

Figure 7:
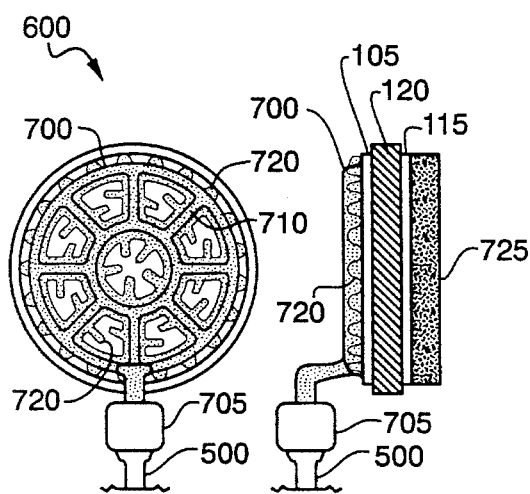
Figure 8:
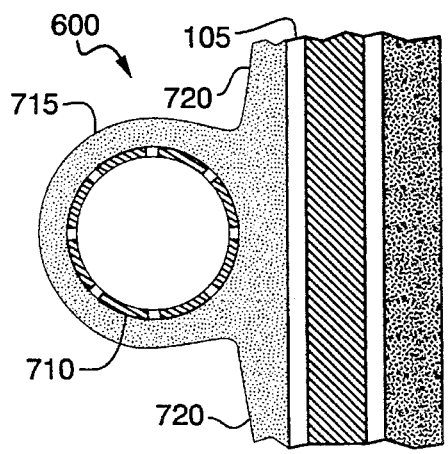
Figure 9:
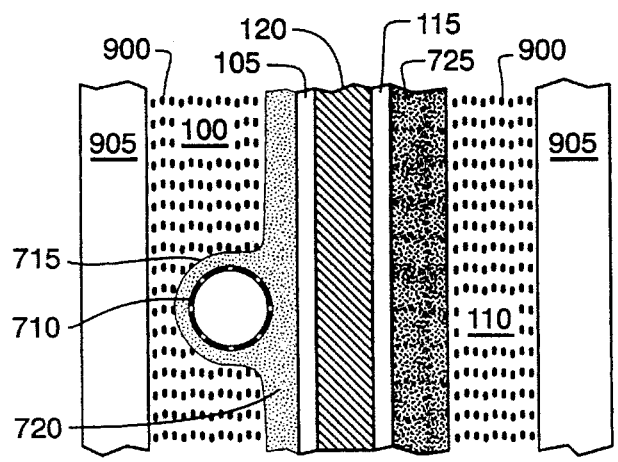

FIGS. 7, 8, and 9 are mechanical schematic representations of one embodiment of the invention's hollow anode wick structure.

Figure 10:
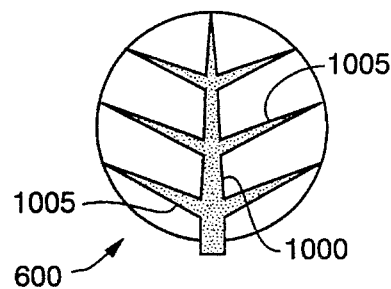

FIG. 10 is a block diagram representation of another embodiment of the invention's hollow anode wick structure.

Figure 11:
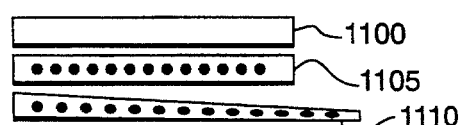
Figure 12:

FIGS. 11 and 12 are representations of hollow tubing that can be used to manufacture the invention's hollow artery anode wicks.

Figure 13:
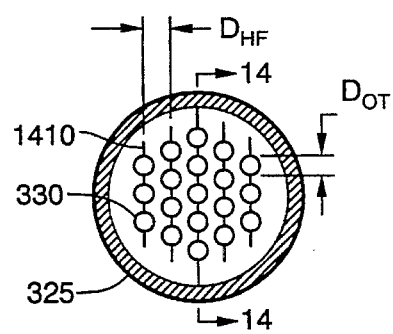
Figure 13:
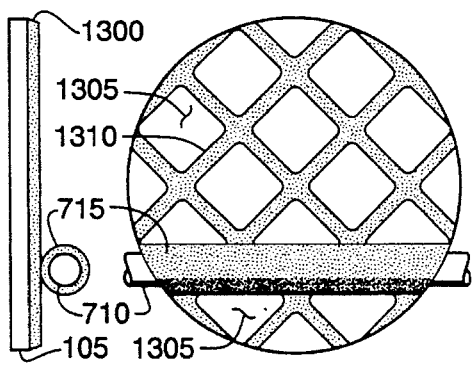

FIG. 13 represents an alternative means of manufacturing a hollow artery anode wick backing material in accordance with the invention.

Figure 14:
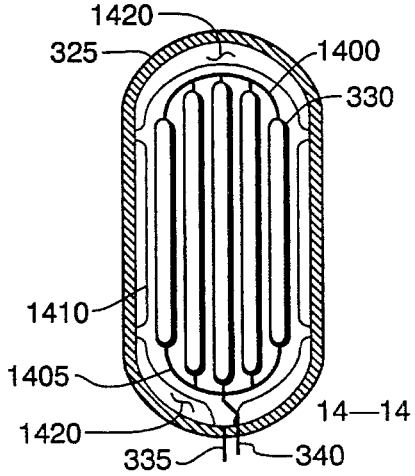

FIG. 14 is a block diagram representation of a fuel cell system utilizing a novel gaseous reactant storage system in accordance with the invention.

4. DETAILED DESCRIPTION OF SPECIFIC EMBODIMENTS

Figure 5:
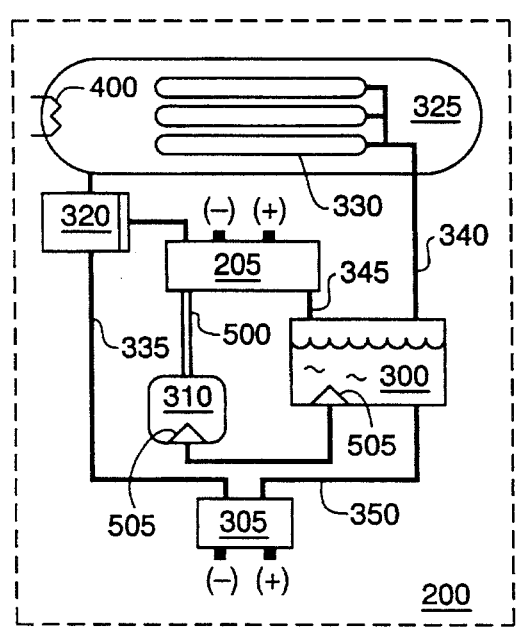
FIG. 5 is a block diagram representation of the invention—an ultra-passive, variable pressure, regenerative fuel cell system.

One illustrative embodiment of a fuel cell system which incorporates novel fuel cell and gas storage tank designs is shown in FIG. 5. For convenience, we denote such a system as an ultra-passive, variable pressure, regenerative fuel cell system, hereafter referred to as a UPVPR fuel cell system.

In this illustrative embodiment, gaseous hydrogen and oxygen reactants are located in one light weight storage tank 325 made from conventional high strength composite material such as a carbon-carbon fiber or metal alloy. This storage tank feeds a fuel cell element 205 which has located below it a main water tank 300 for collecting the product water from the chemical reaction of the hydrogen and oxygen during system operation. Water from the main water tank floods an electrolyzer 305 located directly below the water tank. During recharging operations, the electrolyzer produces gaseous hydrogen and oxygen which subsequently refills the gas storage vessel.

While only one fuel cell is shown, it is to be understood that the fuel cell system of the present invention contemplates the use of a multiplicity of fuel cells. Similarly, the electrolyzer 305 may be comprised of a multiplicity of cells.

A hydrogen line 335 from the hydrogen gas supply tank 325 is connected to both the fuel cell 205 and electrolyzer 305. In this configuration, hydrogen is supplied to the anode side of the fuel cell and is extracted from the cathode side of the electrolyzer. An oxygen line 340 is attached directly from the internal oxygen storage tank 330 to the main water tank 300. From the main water tank, oxygen is transferred to the cathode side of the fuel cell through line or conduit 345.

As shown in FIG. 5, the fuel cell 205, main water tank 300, and electrolyzer 305 are stacked vertically so that the liquid water produced at the fuel cell's cathode is concurrently directly drained into the water tank through line 345 via gravity. Water stored in the main water tank can also be fed, under gravity, to the anode side of the electrolyzer. During operation of the electrolyzer, oxygen produced at the electrolyzer's anode (not shown) passes through line 350 into the main water tank and, from there, back to the internal oxygen storage tank 330 via line 340.

An anode water feed line 500, exiting the top the secondary water tank 310, is connected directly to the bottom of the fuel cell 205. Furthermore, the anode water feed line 500 is completely wicked—from the top of the secondary water tank to the bottom of the fuel cell—where it (the wick) makes direct contact with the fuel cell's anode surface. Some possible embodiments of an UPVPR system's fuel cell wick design are discussed below with reference to FIGS. 7–13.

Ball and cage check valves 505 in the main and secondary water storage tanks are incorporated to prevent the possible mixing of hydrogen and oxygen gases in the event either the water tank is emptied of water due to inadvertent over pressurization of either the hydrogen gas or oxygen gas storage tanks.

A novel feature of the UPVPR fuel cell system shown in FIG. 5 is the manner in which hydrogen and oxygen gas is stored. As shown, the oxygen storage tank 330 is enclosed within the hydrogen storage tank 325 and is composed of multiple cylindrical vessels discussed in more detail below with reference to FIG. 14. Heating and cooling coil 400 helps prevent: (a) icing inside the storage tanks due to isentropic expansion during UPVPR electrical power production and (b) overheating of gases due to isentropic compression during electrical recharge operations.

4.1 Hollow Artery Anode Wick Designs

Inclusion of an anode wick in the design of a fuel cell system advantageously reduces: (a) the likelihood of the PEM's anode surface from drying, a well-known problem in conventionally designed fuel cell systems, and (b) the number of elements such as pumps, compressors, and valves needed to implement the system. This latter feature also makes the UPVPR fuel cell system lighter and more (mechanically) reliable. (The reduction in required equipment, such as pumps and compressors, to ensure that fuel cells' PEM/anode surfaces are kept wet motivates the use of the "ultra" modifier in the name ultra-passive, variable pressure, regenerative fuel cell system.)

Figure 1:
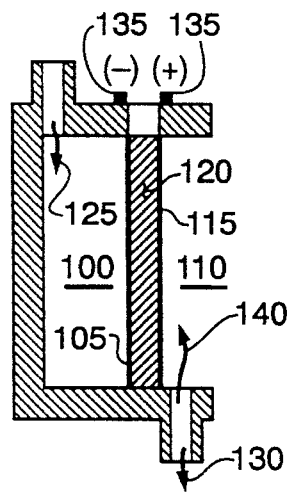
FIG. 1 is a block diagram representation of a conventional gaseous hydrogen, gaseous oxygen fuel cell.
Figure 2:
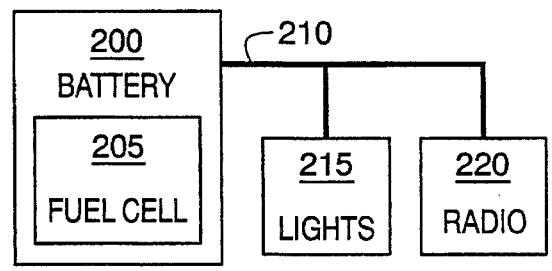
FIG. 2 is a block diagram representation of a battery powered electrical system employing a fuel cell system.
Figure 3:
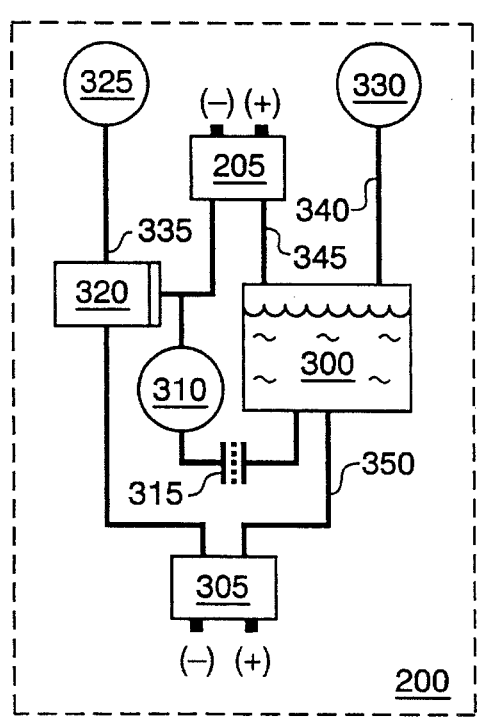
FIGS. 3 and 4 are block diagram representations of a fuel cell system.
Figure 4:
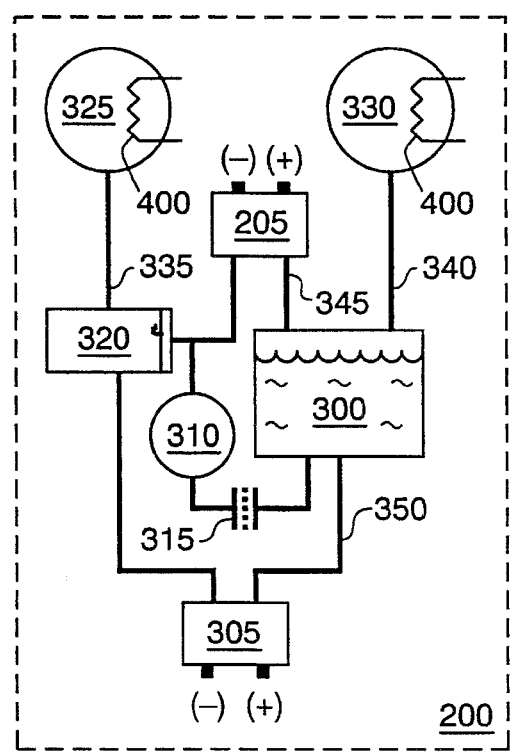
Figure 6:
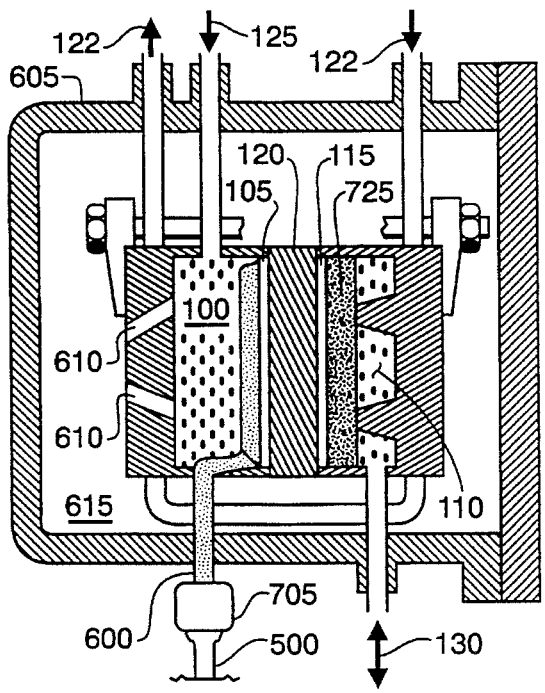
FIG. 6 is a mechanical schematic of a pressurized fuel cell utilizing the invention's wicked anode structure.

FIG. 6 shows a schematic of one specific embodiment of a fuel cell, utilizing a wicked design, that addresses the problem of proton exchange membrane (PEM) drying. A basic difference between the prior art fuel cell of FIG. 1 and the design embodiment shown in FIG. 6 is the inclusion in the latter of an anode wick 600 in contact with the fuel cell's anode surface, running down through the bottom of the fuel cell's anode chamber 100 and attaching to the anode water feed line 500 of FIG. 5.

Because the UPVPR fuel cell is a high pressure device (operating between, roughly, 21 MPa or 3000 psi and 2.1 Mpa or 100 psi), the fuel cell assembly is located inside a pressure vessel assembly 605 designed to also contain hydrogen gas. Hydrogen gas within the anode chamber 100 is in direct communication with the anode electrode 105 via vent passages 610. This prevents the PEM 120 from rupturing due to pressure imbalances within the fuel cell assembly—i.e., between anode/cathode chambers (100 and 110) and outer cavity 615.

4.1(a) Wagon-Wheel Wick Design

Incorporating hollow arteries into the design of an anode wick helps to significantly reduce the amount of wick material (both mass and volume) required for pumping water from a water reservoir (e.g., tank 310 of FIG. 5) and distributing it over the face of the fuel cell's anode surface. By reducing the wick's size, more of the anode's surface can be exposed to hydrogen gas, allowing the relatively high fuel cell current densities required for successful variable pressure passive regenerative fuel cell operation.

Details of one embodiment of a hollow artery anode wick 600 are shown in FIGS. 7 and 8. This wick comprises a water feed pipe 500 which transports water from a reservoir (e.g., the secondary water tank 310) to the base of a "wagon-wheel" wick frame 700. The attachment of the water feed pipe 500 to the wick frame 700 occurs at a wick/pipe coupling 705. The feed pipe 500 is hollow, non-porous, electrically non-conducting, and ionically non-conducting.

The wagon-wheel wick frame 700 (which may or may not be in the form of a wagon-wheel depending upon electrode geometry) is made from hollow tubing 710 having porous walls. This porous tubing may be metal or plastic, and is sized to move relatively large quantities of liquid water at a low pressure drop while giving structural support for a porous fabric/foam cover 715. The wagon-wheel frame serves as the hollow arterial structure of the wick assembly.

Completely covering the wagon-wheel's porous tubing 710 is a porous fabric/foam cover 715 made of, e.g., open-pore polyurethane. More generally this cover should be made of a material capable of bonding (or sticking) to the porous tube 710 wall while having small characteristic pore dimensions and contact wetting angles capable of keeping the porous wagon-wheel tubing well primed with liquid water. This cover should also be capable of bonding to the surface of the fuel cell assembly's anode sheet. Other likely candidates for the porous fabric/foam cover include various plastic materials such as the polyurethanes and polytetrafluoroethylenes (PTFEs) that have been previously doped with, e.g., solid wetting agents such as cellulose, asbestos, metal particles, metal oxide particles, and/or silicon oxide particles.

Emanating from the surface of the tube's porous fabric/foam cover 715 are numerous tiny porous fabric/foam fingers 720. In one embodiment, the fingers 720 may be of the same material as the cover 715.

The actual fabric/foam material selected for use as the wick's cover and fingers is made compatible with the fuel cell's anode 105 material of construction. Traditionally, the anode layer has been made from porous PTFE plastic sheets containing various amounts of immobilized platinum black catalyst particles. However, more recent designs appear to be replacing the traditional PTFE electrode with a platinum doped thin-film Nafion™ sheet for improved performance and lower platinum loadings. It appears likely that every manufacturer's electrode will have different wetting characteristics in terms of pore size and wetting contact angle (i.e., the degree of hydrophelia). As such, the material in the anode's porous fabric/foam cover 715 and fingers 720 can be tailored to match the polymeric composite used by any given fuel cell manufacturer on the anode. This matching can be accomplished by artificially changing (via chemical composition and curing techniques) the wick's cover/finger contact angle and pore size.

It needs to be appreciated that the anode 105, cathode 115, PEM 120, and wet-proofed carbon paper 725 is an integral structure—developed over the past 30 years by a number of different commercial entities spending significant sums of money. As such, fuel cell developers and manufacturers may hold as trade secret the exact physical and chemical characteristics of their cell's electrodes. Selecting the proper anode wick materials for a given manufacturer's fuel cell can, therefore, require subsequent dismantling and analysis.

In addition to anode wetting concerns, the wick's 600 materials of construction must also be compatible with high pressure gaseous hydrogen. Hydrogenation to methane gas is a possible design concern. Polytetrafluoroethylenes are known to be a relatively stable material in high pressure/low temperature hydrogen atmospheres. For wick stability however, binder additives (i.e., cellulose, etc.) used during wick manufacture should also be stable in high pressure gaseous hydrogen environments.

FIG. 9 shows an illustrative cross sectional view of a fuel cell utilizing a wagon-wheel wick design. The wick's hollow tubing 710 and fingers 720 are shown inside the anode's 105 hydrogen gas chamber 100. This cavity contains a large mesh metal wire screen current collector 900 held by compression between the anode side of the PEM 120 and the liquid cooled (FIG. 6) metal $H_2/O_2$ separator plate 905. The current collector 900 moves electrons produced at the anode 105, through the anode chamber 100 and onto the $H_2/O_2$ separator plate 905. The screen 900 is allowed to simply lay up against the wick's 600 porous fiber/foam cover 715 and fingers 720. The porosity of the current collector 900 should be large enough to prevent water in the wick 600 from entering and saturating the current collector's pore structure. The cathode aspect of the fuel cell is unaltered from conventional designs.

Alternate embodiments of the wagon-wheel wick design include hollow artery wick structures made directly from tapered and hair size tubing. Commercially available minitubing can be tygon™, silicone, polyethylene, polyurethane, teflon™ and the like which has been treated (i.e., doped) if necessary to become hydrophilic. Such tubing can be molded, heat shrunk, sintered, stretched and tapered with heat treatment to form various configurations.

A first alternate embodiment is shown in FIG. 10 where hair sized tapered tubing has been formed into the shape of a tree trunk with branches. The trunk 1000 and branch 1005 structures can be constructed from hollow tubing 1100 which has been first perforated 1105 with small holes (using heated needles, drills, or similar tools) and subsequently tapered 1110, see FIG. 11. These perforated and tapered tubing segments can be connected and sintered together (as shown in FIG. 12) for delivering anode make-up water across the face of the electrode. Small holes serve both as tubing connectors and watering ports. Such mini-tubing may or may not require porous fabric/foam covers depending upon the wetting characteristics of the fuel cell's anode material and the water make-up flow requirements. The tubing's small perforated holes may be capable of producing the required pumping head all on their own.

4.1(b) Woven-Cloth Wick Design

An alternative anode wick design replaces the porous fabric/foam fingers of the wagon-wheel wick with the hydrophobic/phelic (HPP) knit cloth shown in FIG. 13. As seen in FIG. 13 the HPP knit cloth 1300 is knitted from two different types of thread: hydrophobic (i.e., water repellent) and hydrophilic (i.e., water absorbing). Both threads are treated so that they are conductive to free electrons. Hydrophobic threads can be made from PTFE fibers currently used in making water repellent fabrics for outdoor/mountaineering type clothing. Hydrophilic threads can be made from fibers of sulfonated PTFE, the basic material used in making a fuel cell's proton exchange membrane. Conventional cotton cloth type threads containing cellulose may be substituted for the sulfonated PTFE hydrophelic fibers. Threads made from "rice hull" fibers may also be used because they are very hydrophilic and contain natural electron conducting graphite.

As shown in FIG. 13, the HPP knit cloth 1300 contains repetitive square hydrophobic regions 1305. These regions substantially effectively exclude all liquid water and allow for the passage of hydrogen gas to the anode 105. Surrounding each hydrophobic region are zones of hydrophilic stripes 13 10. These stripes substantially effectively exclude hydrogen gas and allow for liquid water to be effectively transported (via wicking action) from the porous fabric/foam hollow artery 710 to all regions of the fuel cell's anode surface 105 for dryout prevention.

The sizes of the HPP knit cloth's square and striped regions, together with the spacing distance between hollow arteries 710 laying across the HPP cloth's surface, are established by that geometry which maximizes overall fuel cell performance. This optimization is amenable to mathematical analysis.

It is also possible to create a porous felt fabric having the same pattern as shown in FIG. 13 by using many short or chopped sections of these threads' fibers. Whether a knitted cloth is to be preferred over a felt fabric will depend on the comparative costs and manufacturing constraints.

4.2 Single Gaseous Storage Tank Design

Another novel feature of the ultra-passive, variable pressure, regenerative (UPVPR) fuel cell system is the design of the system's gaseous storage tanks. The design shown in FIG. 5, in which the oxygen gas storage tank 330 is enclosed within the hydrogen gas storage tank 325, increases the heat transfer between the separate hydrogen and oxygen gases so that they are at, or very near, the same temperature (i.e., at thermal equilibrium). However, this intimate placement of the individual hydrogen and oxygen tanks increases the probability of catastrophic internal explosions and detonations due to tank leaks.

In order to reduce the possibility of inadvertent internal explosions and detonations, the interior structure of these tanks can be designed with very small internal volume to surface area ratios. Internal rank surfaces can also be covered with solid coatings that are highly non-reflective (i.e., destructive) to the gaseous hydroperoxyl radial $HO_2$ (an important intermediate species in the kinetic chain reaction that produces water from hydrogen and oxygen).

By designing storage tanks that have very small gaseous diffusion distances to a wall surface and covering storage tank surfaces with coatings destructive to $HO_2$, it is possible to covert this explosive hydroperoxyl radical back into stable hydrogen and oxygen via the reaction:

$$HO_2 \xrightarrow{wall} 1/2 H_2 + O_2,$$

or to stable water and oxygen via the reaction:

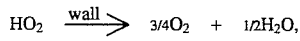
$$HO_2 \xrightarrow{wall} 3/4 O_2 + 1/2 H_2O,$$

before it has had the opportunity to produce even more explosive gaseous radial species via homogeneous chain branching reactions such as:

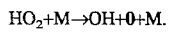
$$HO_2 + M \rightarrow OH + O + M.$$

Here, the symbol M denotes any gaseous species.

Using chemical kinetic information, it is expected that a hydrogen/oxygen storage tank such as the one shown in FIG. 5, will be safe from internal explosions and detonations (due to internal leaks) if the oxygen cylinder inside diameter, $D_{OT}$, and the oxygen cylinder fin spacing distance, $D_{HF}$, are both maintained below 1.27 cm and all internal surfaces are coated with a material as destructive to $HO_2$ as potassium chloride (KCl) salt. [Lewis, B. and Elbe, G., *Combustion, Flames and Explosions of Gases.*, 2d Edition, Academic Press, New York, N.Y., 1961] [Glassman, I., *Combustion*, Academic Press, New York, N.Y., 1977] [Westley, F., *Table of Recommended Rate Constants for Chemical Reactions Occurring in Combustion*, NSRDS-NBS 67, U.S. Government Printing Office, U.S. Dept. of Commerce, Washington, DC, 1980]

One embodiment of the gaseous storage tank shown in FIG. 5 is depicted in FIG. 14. This illustrative design comprises multiple thin walled cylindrical oxygen storage tanks 330 located inside a single high pressure (but lightweight) hydrogen storage tank 325. For UPVPR fuel cell applications, the internal hydrogen gas volume within hydrogen storage tank 325 should be slightly less than twice the total oxygen gas volume within all oxygen tanks 330 so that the hydrogen gas pressure will be approximately 69 kPa (10 psid) higher than the oxygen gas pressure when the storage tank 325 is at a uniform temperature and fully charged to approximately 21 MPa (3,000 psia). The molar quantity of hydrogen gas within tank 325 should be approximately twice the molar quantity of oxygen gas within tanks 330.

The hydrogen storage tank 325 may be oriented in the vertical direction for natural convection heat transfer purposes. At least some of the oxygen storage cylinders 330 are manifolded together at the top and bottom. The top manifold 1400 and bottom manifold 1405 allow the oxygen gas stored within tanks 330 to recirculate by buoyancy effects whenever a vertical temperature gradient exists in the gas. Likewise, the oxygen tank's HX/quench fins 1410 are also oriented in the vertical direction (with gaps 1420 at the top and bottom of hydrogen tank) so that the hydrogen stored within tank 325 is allowed to be recirculated by buoyancy effects whenever a vertical temperature gradient exists in this gas. Hydrogen and oxygen storage tanks designed in this fashion, with plenty of internal surface area (due to the small values assigned for $D_{OT}$ and $D_{HF}$, should always be capable of maintaining relative uniform gas temperatures within them.

Finally, ate tank's hydrogen 335 and oxygen 340 gas lines are placed at the bottom of the hydrogen/oxygen storage tanks in order to allow all moisture condensate that is produced inside these cavities to readily drain by gravity.

For transportation applications where light-weight tanks are required, hydrogen tank 325, oxygen tanks 330, and HX/quench Fins 1410 may be manufactured from a light-weight graphite/epoxy fiber woven composite material. Such light-weight structural materials can be covered with metallic liners for good leak-tight seals. Companies such as Structural Composites Industries (SCI in Pomona, Calif.) and Brunswick Defense (Costa Mesa, Calif.) have long term experience manufacturing such tanks. For safety reasons, cited above, these metallic liners are subsequently covered with a $HO_2$ destructive coating such as a potassium salt.

4.3 Advantages of Invention

Operation of the fuel cell systems of FIG. 5 is analogous to that of a rechargeable lead acid battery. The electric load is connected to the electric terminals of the fuel cell 205 and the recharging sub-system is connected to the electrical terminals of the electrolyzer 305.

Advantages of an ultra-passive, variable pressure, regenerative fuel system include the ability to simultaneously draw power (i.e., discharge) and recharge the fuel cell system. In addition, the system is considerably lighter than a conventional lead-acid battery, such as is commonly found in motor vehicles, making it an ideal candidate for applications requiring battery-like operation but low weight. Additional benefits of the UPVPR fuel cell system include:

1. The described hollow artery anode wick designs reduce the possibility of fuel cell anode damage due to water flow interruptions while simultaneously reducing the weight and mechanical complexity (thereby increasing the system's reliability) of the fuel cell system.

2. Very high specific power and energy levels compared to prior technologies (approximately an order of magnitude higher than modem battery technologies such as nickel-metal-hydride and approximately 200 times that of conventional lead-acid batteries).

3. A long expected life. Approximately 10 to 15 years (estimated) compared to a typical lead-acid battery life of about four to five years.

4. The described fuel cell designs can be disposed of at the end of their useful life with comparatively little environmental impact. Perhaps the most significant environmental problem arises from the use of platinum, but for two reasons that problem is expected to be imminently manageable. First, there is only a very small quantity of platinum involved in the proton exchange membrane, compared with the large quantities of lead used in conventional lead-acid batteries; and second, platinum metal is extremely valuable, making it economically worthwhile to recover the platinum from exhausted fuel cell systems.

In the interest of clarity, not all features of an actual implementation were described in this specification. It will of course be appreciated that in the development of any such actual implementation (as in any hardware design project), numerous implementation-specific decisions must be made to achieve the designers' specific goals and subgoals, such as compliance with system- and business-related constraints, which will vary from one implementation to another. Moreover, such an effort might be complex and time-consuming, but would nevertheless be a routine undertaking of design engineering for those of ordinary skill having the benefit of this disclosure.

It will be appreciated by those of ordinary skill having the benefit of this disclosure that numerous variations from the foregoing illustration will be possible without departing from the inventive concept described herein. Accordingly, it is the claims set forth below, and not merely the illustrative examples described herein that are intended to define the exclusive rights claimed in this design.

5. CLAIMS

What is claimed is:

1. A regenerative fuel cell system comprising:

(a) a fuel cell having (1) an anode with an anode hydrogen inlet, and (2) a cathode having a cathode oxygen inlet;

(b) a main water storage tank having (1) a fuel cell oxygen outlet communicating with said cathode oxygen inlet (2) a first oxygen inlet, referred to as an electrolyzer-to-water tank inlet, and (3) a second oxygen inlet, referred to as an oxygen-tank-to-water-tank inlet;

(c) a water electrolyzer having (1) an electrolyzer oxygen outlet communicating with said electrolyzer-to-water-tank inlet, and (2) an electrolyzer hydrogen outlet;

(d) a hydrogen storage tank having (1) a hydrogen tank inlet communicating with said electrolyzer hydrogen outlet, and (2) a hydrogen tank outlet communicating with said anode hydrogen inlet and with said electrolyzer hydrogen outlet;

(e) an oxygen tank having an oxygen tank outlet communicating with said oxygen-tank-to-water-tank inlet;

(f) a wick having (1) an anode end in contact with said anode and (2) a water end in direct communication with a source of water, referred to as a wick water reservoir.

2. The regenerative fuel cell system of claim 1, wherein said wick water reservoir is a secondary water tank having a secondary water tank inlet communicating with said main water tank.

3. The regenerative fuel cell system of claim 2, wherein said secondary water tank is located below said main water tank.

4. The regenerative fuel cell system of claim 2, wherein said secondary water tank inlet comprises a ball and check valve.

5. The regenerative fuel cell system of claim 2, wherein said main water tank further comprises a ball and check valve communicating with said secondary water tank inlet.

6. The regenerative fuel cell system of claim 1, wherein said wick water reservoir is said main water tank.

7. The regenerative fuel cell system of claim 1, wherein at least part of said oxygen tank is located within said hydrogen tank.

8. The regenerative fuel cell system of claim 7, wherein said hydrogen tank further comprises one, or more, heating and cooling elements.

9. The regenerative fuel cell system of claim 7, wherein at least one of said hydrogen tank and said oxygen tank includes a coating destructive to a hydroperoxyl radical ($HO_2$).

10. The regenerative fuel cell system of claim 9, wherein said coating comprises a potassium chloride (KCl) salt.

11. The regenerative fuel cell system of claim 1, wherein said oxygen tank comprises a plurality of oxygen tubes.

12. The regenerative fuel cell system of claim 11, wherein at least some of said oxygen tubes have an interior diameter of less than 1.27 cm.

13. The regenerative fuel cell system of claim 11, wherein at least some of said plurality of oxygen tubes are connected by at least one manifold.

14. The regenerative fuel cell system of claim 11, wherein said oxygen tubes are joined by fins.

15. The regenerative fuel cell system of claim 14, wherein at least some of said fins are spaced less than 1.27 cm apart.

\* \* \* \* \*